June 16, 1936.　　　　S. L. CASELLA　　　　2,044,418
COCOANUT PARING MACHINE
Filed Jan. 13, 1932　　　3 Sheets-Sheet 3
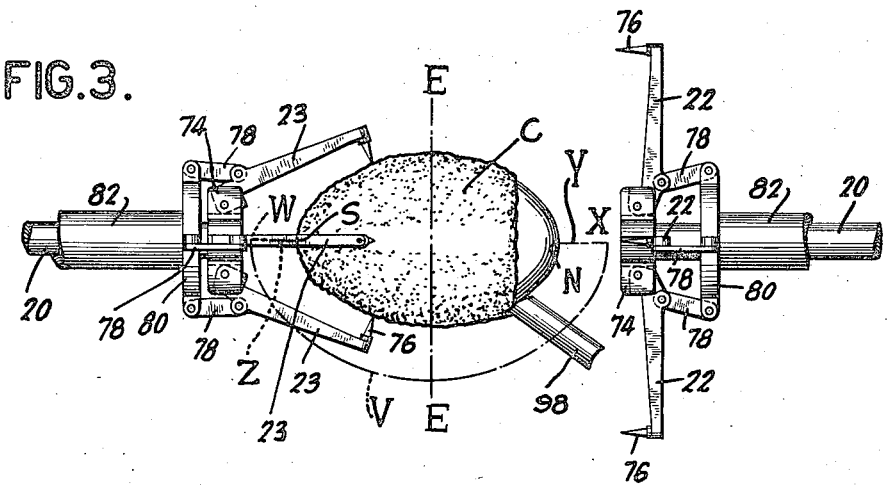
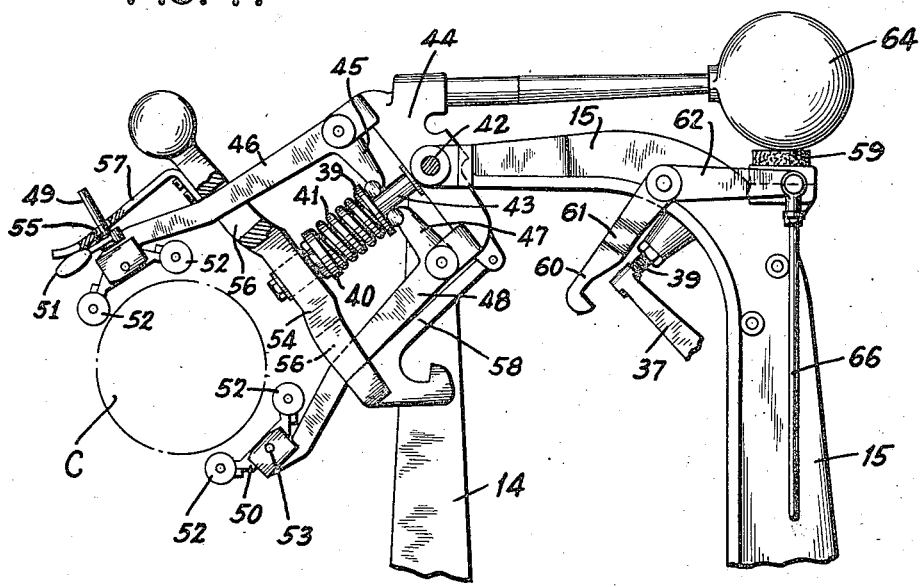
INVENTOR
SECONDO L. CASELLA
BY
*Bohleber & Ledbetter*
ATTORNEYS Patented June 16, 1936

2,044,418

UNITED STATES PATENT OFFICE 2,044,418

COCOANUT PARING MACHINE

Secondo L. Casella, New York, N. Y., assignor to Franklin Baker Company, New York, N. Y., a corporation of New Jersey Application January 13, 1932, Serial No. 586,317

28 Claims. (Cl. 146—7)

This invention relates to cocoanut paring machines.

At the present time, the husk is manually removed from a cocoanut and the shell is also manually struck off by a skilled operator. It is then necessary to pare the shelled cocoanut to remove the skin surrounding the meat and immediately within the shell. This skin is also removed manually at the present time. Previous attempts to pare off this skin automatically have not been successful.

The primary object of the present invention is automatic means for paring a cocoanut.

Cocoanuts are frequently irregular in outline and another object of the invention is to provide yielding positioning means for the cocoanut which shall oppose the thrust of the knife and at the same time conform to the contour of the cocoanut and permit the same to be rotated therewithin.

Another object of the invention is the provision of cocoanut gripping or clamping means which shall not interfere with the knife in the paring operation and which shall rotate the cocoanut at a desired speed.

It is also an object of the invention to provide a knife which shall follow the contour of the cocoanut and peel the same as it is rotated.

A further object of the invention is a knife construction which can be adjusted whereby a predetermined depth of peel may be removed.

The invention also seeks automatic means for moving the cocoanut out of the machine to a position where it may be readily ejected and replaced by a fresh unpared cocoanut.

Still another object of the invention is a cocoanut paring machine in which the various manipulations are performed automatically and seriatim in a construction which is practical from the standpoint of ease and cheapness of manufacture and convenience and reliability in operation.

In accordance with the invention, the cocoanut is yieldingly supported between rollers which are preferably spring pressed. At least one of these cocoanut supporting rollers may, if desired, be manually displaced and replaced in the insertion and removal of a cocoanut. Cocoanut gripping means is provided to engage the cocoanut at opposed ends, the gripping means being so actuated that the cocoanut is gripped at one end or upon one side of a median plane and rotated by the gripping means while the knife is paring the opposite half, and then the pared half is gripped and the cocoanut rotated by the gripping means there engaging it, while the paring operation is completed. In the paring operation, the paring knife is adapted to contact with the cocoanut, at one end, at what may be considered the pole thereof, and is yieldingly held in engagement with the cocoanut and caused to travel toward what may be considered its equator, and continues to travel in engagement with the cocoanut until it reaches the other pole or opposite end, when the knife is carried away from the cocoanut and moved back to starting position. An overbalanced carrier for the cocoanut is normally latched in operative position, but is released upon the completion of the paring operation and is swung outwardly out of the machine by means of a counterweight.

These and other objects of the invention and the means for their attainment will be more apparent from the following detailed description, taken in connection with the accompanying drawings illustrating one embodiment by which the invention may be realized, and in which:—

Figure 3 is a view, somewhat diagrammatic, showing a partially pared cocoanut supported at one end and also showing the path taken by the knife; and Figure 4 is a fragmentary view showing the cocoanut carrier released and in cocoanut ejecting position.

Figure 1:
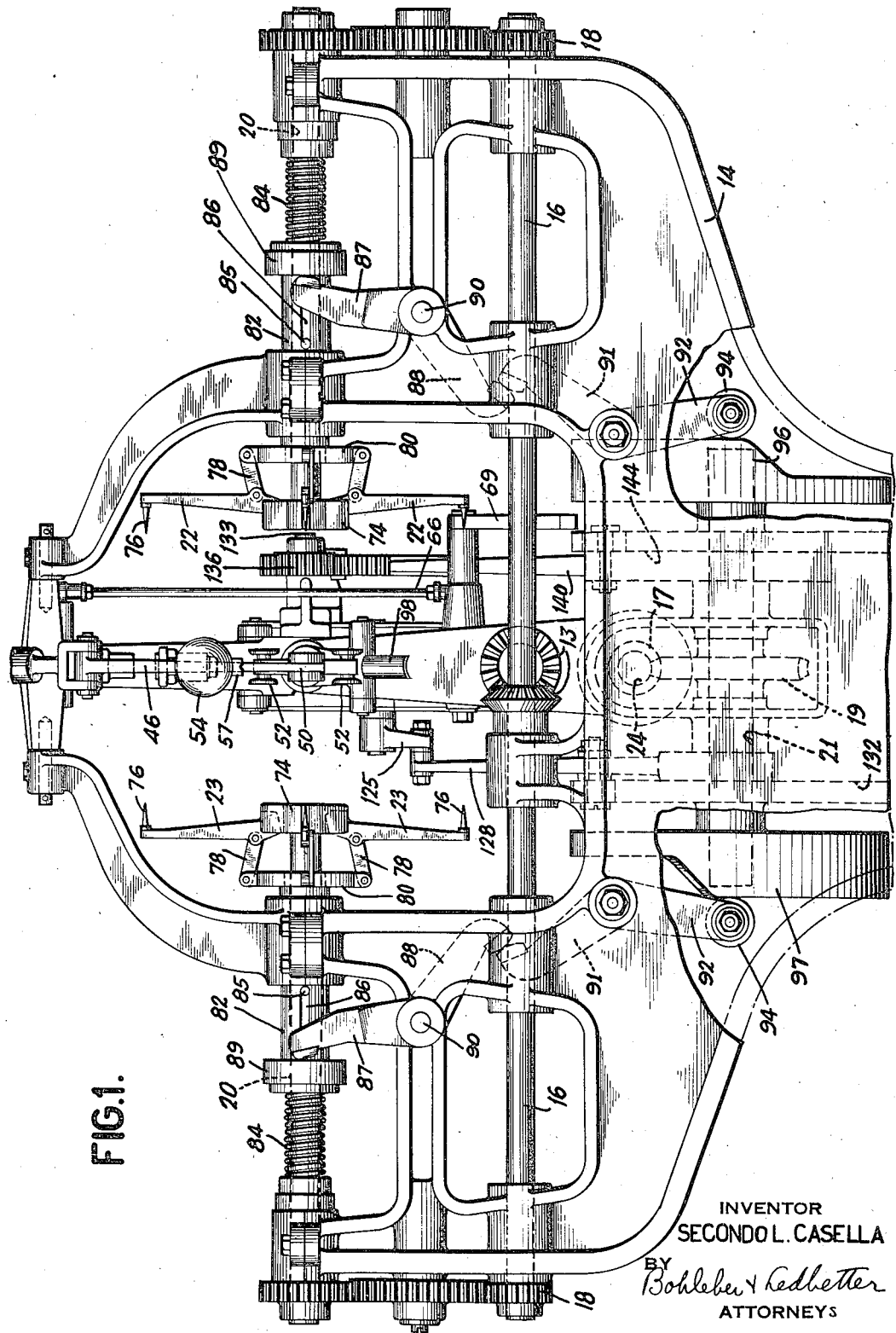
Figure 1 is a view in front elevation showing the cocoanut paring machine at rest, the base and counterweight, among other parts, being broken away in the interest of compactness of illustration.
Figure 2:
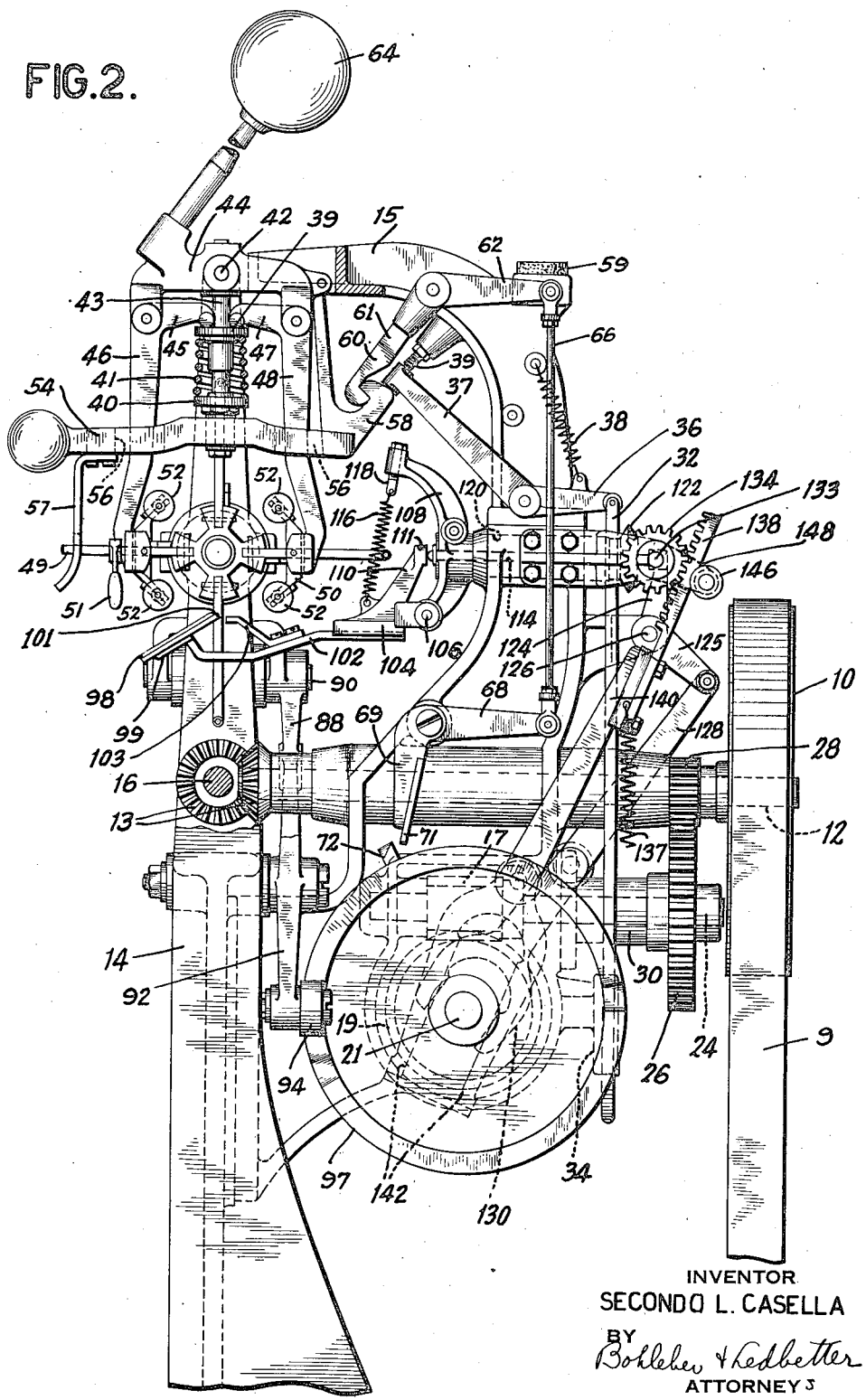
Figure 2 is a view looking from the right of Figure 1 and showing, on the same scale, the cocoanut paring machine in side elevation, the cocoanut gripping means and support therefor on the right hand side of the machine being removed to show the knife and carrier therefor.

Referring first to Figure 2, it will be noted that the power, in the illustrated embodiment, is furnished the machine by a belt 9 from a prime mover, not shown, to the belt pulley 10, which pulley is mounted upon a power shaft 12 suitably journaled in the frame 14 of the machine. The power shaft 12 extends forwardly to the front of the machine and drives, by means of beveled pinions 13, a transverse jack shaft 16. The jack shaft 16 rotates, through the intermediate change speed gearing 18, (Figure 1) at each end thereof, spindles 20 upon which the chucks or gripping fingers 22, 23 are respectively mounted. By appropriately proportioning the gearing thus described, the spindles 20 are constantly rotated at the desired speed. Transversely of the power shaft 12, there is journaled in the frame 14 a cycle shaft or cam shaft 21, rotated, in the illustrated embodiment, by a worm 17 and worm wheel 19 from a worm shaft 24, rotated by a suitable gear 26 (Figure 2) loosely mounted on the worm shaft 24 and constantly in mesh with a pinion 28 fixed on the power shaft 12. To rotate the worm shaft 24 from the power shaft 12, the gear 26 is adapted to be clutched to the power shaft by suitable clutch devices 30 actuated by a clutch operating rod 32 vertically movable in a bearing 34 and actuated from a bell crank 36, 37 journaled on the upper part of the frame and normally tending to move to clutch releasing position through the intervention of the spring 38. The bell crank 36, 37 is held in clutch engaging position against the action of the spring 38 by latching devices 58, 60, hereinafter described. Briefly, these latching devices hold the cocoanut in position to be pared, but when the cocoanut carrier is released by the latching devices to swing the cocoanut out of the machine, such movement of the cocoanut carrier releases the arm 37 of the bell crank and permits it to be swung in a counterclockwise direction (as viewed in Figure 2) under the influence of the spring 38 to release the clutch and allow the cycle shaft 21 to cease rotation.

At the top of the machine, the frame 14 comprises a forwardly extending arm 15 upon which is mounted the cocoanut carrying frame. This frame is pivotally supported, as at 42, and consists of a rocking member 44 to which is mounted two depending bell crank like arms 45, 46 and 47, 48, respectively, having at the lowermost ends of the arms 46 and 48, and pivoted as at 53, brackets 50 carrying spaced flanged rollers 52. There is one pair of rollers 52 on each bracket 50, 52, respectively, and these rollers are so disposed as to engage and hold, by means of the flanges, a cocoanut therebetween, preferably at diametrically opposite points, the flanges forming line contacts which readily engage the oddly shaped nut. From the rocking member 44, centrally thereof, depends a rod 43 bearing a sliding collar 39 and a fixed collar 40. The arms 45 and 47 bear against the sliding collar 39, which is spring pressed thereagainst by a compression spring 41. On the lower end of rod 43 is fixed a transversely extending guide member 54 formed with slots 56 within which the depending arms 46 and 48 move toward and away from one another to grip and release the work. This slotted frame member 54 carries on its rearward end a latch member 58, extending, as shown, downwardly from a connection with the rocking member and adapted to be engaged, when the work carrier 43—58 is in cocoanut paring position with a latch member 60 on one arm 61 of a bell crank 61, 62 pivotally mounted on the frame arm 15 to hold the same in position.

The lower end of arm 46 is apertured to receive a guide rod 49 rigidly mounted on the front bracket 50 and guided by a slot 55 in a guide bracket 57 downwardly depending from the slotted frame member 54. The rod carries a handle 51, which may be grasped and moved outwardly to separate the arms 46 and 48 to permit the work to fall out of the carrier. The guide rod 49 serves to relatively relate the spaced rollers 52 on arm 46, so that a cocoanut will find its position in contact with the flanges on both rollers and will be centralized with respect to the axis of the chucks 22 and 23, the other bracket 50 on arm 48 being free to conform to the peculiarities in the shape of each nut supported thereby.

In operation, when the bell crank 61, 62 is rotated in a clockwise direction, as viewed in Figures 2 and 4, the latch 60 releases the latch member 58 and permits the counterweight 64, secured to the rocking frame 44 and overbalancing the depending structure, to swing this depending work carrier outwardly out of the axis of the spindles 20 so that the pared cocoanut may be removed therefrom and a new or unpared cocoanut inserted. As shown in Figure 4, the work ejecting position of the carrier is determined by a yielding stop 59 for the counterweight 64. The latch mechanism is actuated by means of a connecting rod 66 secured to the rearwardly extending arm 62 of the latching bell crank 61, 62 and extending downwardly to the rearwardly extending arm 68 of a bell crank 68—69 also pivoted upon the frame of the machine. The depending arm 69 thereof has a contact surface 71 for engagement by a cam 72 on the cycle shaft, hereinafter to be described.

Referring now to Figure 1, on the inner end of each spindle 20, is a chuck frame 74 upon which are pivoted the chuck arms 22 at the right and 23 at the left, each having an inwardly directed tooth 76 at the end thereof. Near the inner end, the arms or fingers 22, 23 are connected as by links 78, with a flange or arm 80 mounted on a sleeve 82 reciprocable on the spindle 20 and urged in one direction by the spring 84 to cause the fingers 22, 23 to turn downwardly to engage the cocoanut and grip the same. A pin 85 on spindle 20, extending into a slot 86 in the sleeve 82, causes the sleeve 82 to turn with the spindle 20 and limits relative axial movement therebetween. The sleeve 82 is moved in the opposite direction against the spring by an arm 87 of a bell crank 87, 88, pivotally mounted upon the frame, which arm engages a flange 89 on the sleeve 82, and the bell crank is adapted to be rotated about its pivot 90 by the arm 91 of another bell crank 91, 92, also pivoted on the frame, the other arm 92 of which carries a roller 94 adapted to follow the contour of a clutch actuating cam 96 on the cycle shaft 21. It will be obvious that the roller 94 is caused to follow the surface of cam 96 by the action of the spring 84 which, through the two bell cranks, holds it thereagainst. Thus, the roller 94 follows the contour of the cam and at the high points thereof, bell crank 91, 92 is rotated in a counterclockwise direction (considering the right hand crank in Figure 1) to cause bell crank 87, 88 to rotate in a clockwise direction against the action of the spring 84 to slide the sleeve 82 to the right, as viewed in Figure 1, to cause the arms 22 of the chuck to open. The chucks and chuck actuating mechanism just described are identical upon both sides of the machine and corresponding parts are provided with like reference characters. The two cams 96, 97 are identical except that the cam 97 on the left hand side of the machine (as viewed in Figure 1) is turned through just a little less than 80° on the cycle shaft 21, so that during most of the cycle of operations one of the chucks 22, 23 is in cocoanut gripping position while the other is in work releasing position, as in Figure 3, although there is one point in the cycle just when the latch 58, 60 disengages and the cycle shaft is declutched from the power shaft, when both chucks release the cocoanut, as in Figure 1, so it can be removed and replaced.

The paring knife 98, Figure 2, is mounted upon an arm 102 extending forwardly from a knife carrier 104 pivotally mounted, as at 106, on a substantially crescent shaped knife support 108. Extending upwardly above the pivot, the knife carrier 104 is formed with an upwardly and rearwardly extending arm 110 having a bearing surface 111 adapted to be engaged by a reciprocating plunger 114 to rotate the arm 110, and hence the knife carrying arm 102, in a counter-clockwise direction about the pivot 106, as viewed in Figure 2, such movement being opposed by the spring 116 extending from the knife carrier proximate the arm 102 to a tension adjusting member 118 in the upper extremity of the knife support 108. The knife support 108 is fixed on the end of a hollow shaft 120 through which the plunger 114 reciprocates, the shaft 120 being adapted to turn about its axis carrying the knife support therewith to cause the knife to travel in an arcuate path about the work mounted in the rollers 52.

At its rear end, the hollow shaft 120 is provided with a beveled pinion 122. The plunger 114 normally extends outwardly beyond the end of the pinion 122 by virtue of the pressure exerted on the plunger 114 by the spring pressed arm 110 of the knife carrier. The plunger is engaged, for reciprocation, by the arm 124 of a bell crank 124—125 pivotally supported upon a bracket on the frame 14 on the left hand side of the median plane thereof, and connected at the end of arm 125 with the upper end of a pitman 128 having a bifurcated end 130 embracing the cam 132, Figure 1, on the cycle shaft 21. Thus, when this cam 132 rotates, the pitman 128 is given a reciprocatory movement to rotate the bell crank about the pivot 126, and when the cam causes the pitman 128 to move in an upward direction, the bell crank 124—125 is caused to rotate in a counter-clockwise direction, as viewed in Figure 2, to press the plunger 114 to the left, as viewed in that figure, and cause the knife carrier 104 to rotate in a counter-clockwise direction about the pivot 106 thereby carrying the knife downwardly away from the axis of the spindles 20 and away from the work. When the pitman 128 is moved in a downward direction, the bell crank 124—125 is turned in a clockwise direction, permitting the plunger to be returned to the position shown in Figure 2, by the action of the arm 110 of the knife carrier, under the influence of spring 116.

On the right hand side of the frame, as viewed in Figure 1, is a mechanism for rotating the hollow shaft 120 and, of course, the knife support 108 therewith. Journaled in a bracket at the side of the frame is a stub shaft 133, carrying at its end a beveled pinion 134, Figure 2, in mesh with the pinion 122 on the hollow shaft 120, and at the outer or right hand end, a pinion 136, adapted to mesh with a reciprocating rack 138. This rack 138 is carried on the end of reciprocating arm 140 bifurcated at its lower end, as at 142, to embrace a cam 144 by which the arm 140 is moved up and down. The rack 138 is held in mesh with the pinion 136 by means of a roller 146 rotatably mounted upon an arm 148 pivotally supported, for convenience, on the shaft 133 and a tension spring 137, conveniently connected between arm 140 and some fixed part of the frame, normally tends to retain the arm 140 in its lowermost position. Thus, when the arm is moved upwardly by the cam 144, the rack 138 causes the shaft 133 to rotate in a counter-clockwise direction, as viewed in Figure 2, to rotate the hollow shaft 120 in a clockwise direction, as viewed in Figure 1, and thereby move the knife carrier 104 in an arc from the right hand side of the work supporting rollers 52 downwardly therebeneath and to the left hand side, as viewed in Figure 1. When the dwell in the cam 144 is reached, the spring 137 causes the reciprocation of the arm 140 in the opposite direction and the rack 138 then causes the rotation of the shaft 120 and knife carrier 104 to travel in the opposite direction (counter-clockwise) to return it to initial position.

Details of the knife or cocoanut parer 98 are illustrated in Figure 2. The blade 98 is convex (transversely) and is adjustable in the transverse plane of the spindles 20 by any convenient means, such as screw and slot connections, with respect to the blade support 99, whereby the sharpened edge 101 is brought closer to or further away from the work either to compensate for wear or to adjust for the depth of the cut. The depth of the cut is also controlled by a knife guard 103 also adjustably mounted, if desired, on the knife arm 102 to bring it nearer or further away from the cutting edge 101.

The operation of the cocoanut paring machine will be apparent from the foregoing description. Suffice it to say that the spindles 20 are constantly rotating and hence, of course, the chucks 22, 23 constantly rotate. When the machine is otherwise inoperative, both chucks are open, as shown in Figure 1. To insert a cocoanut, and assuming the latch 58 is disengaged from the nose 60, the cocoanut supporting structure is then swung outwardly about its pivot 42, as shown in Figure 4, by the action of the counterweight 64, which overbalances it. Cocoanuts may be spherical, ellipsoidal and are sometimes more or less egg-shaped, and the work carrier is designed to accommodate and centralize any shaped nut. The cocoanut is inserted between the rollers 52 with its longer axis in the axis of the spindles 20, the two arms 46, 48 being urged by spring 41 to approach one another and thus yieldingly support the cocoanut in the supporting structure. The front bracket 50, being relatively fixed in position, tends to move the cocoanut so that an axis is axially of the spindles. The supporting structure is then returned by moving it in a counter-clockwise direction about the pivot 42 until an axis of the cocoanut lies substantially in the axis of the spindles and the latch 58 has become engaged and retained by the latch member 60. During this movement, the latch 58 has picked up the arm 37 of the clutch actuating member and moved it against the adjustable stop 39, and thereby retains the clutch arm 37 in the clutch engaging position shown in Figure 2. Thus, the movement of the cocoanut supporting structure to operative position, just described, results in clutching the worm shaft 24 to the power shaft 12, through the gearing 26, 28, and results in the initiation of the rotation of the cycle shaft 21. The knife 98, at rest, is conveniently at neutral, as shown in Figure 2, and when the machine starts, it moves to the starting point X, at the right hand side of the cocoanut supporting structure, as shown in Figure 3. The first movement of the cycle shaft 21 also brings the high spot of the cam 97 to such position that the chuck fingers 23 on the left, are caused to engage the cocoanut C. It is apparent that the fingers are revolving before and during the time of closing and, in fact, the spindles never cease rotating.

The fingers 23 engage the cocoanut at a point to the left of a transverse plane E, Figure 3, including, say, the minor axis of the cocoanut C. The knife 98 is at this time approximately at the point X. While the fingers 23 are moving to engage the cocoanut, the cam 132 is rocking the bell crank 124, 125 in a clockwise direction, as viewed in Figure 2, to permit the plunger 114 to be retracted by the spring 116, whereby the knife moves in the path indicated by the broken line Y into engagement with the cocoanut on the major axis thereof, as indicated by the point N. Having been gripped by the chuck fingers 23, the cocoanut is, of course, constantly rotating at this time and no sooner does the knife reach the point N and begin removing a thin peel from the cocoanut at that point than the cam 144 begins the advancement of the arm 140 and rack 138, thereby rotating the pinions 134 and 136 to rotate the hollow shaft 120 in a clockwise direction and cause the knife holder 108 to also rotate in a clockwise direction, thereby carrying the knife 100 downwardly on an arc inscribed about the axis of the shaft 114, the knife being always yieldingly held in engagement with the cocoanut by virtue of the spring 116. Obviously, by means of adjusting element 118, the tension of the spring 116 may be adjusted so that the knife is held against the cocoanut with just sufficient pressure to pare away the skin but not to cut too deeply into the meat, and, of course, the guard 103 of the knife prevents it from cutting too deeply. As the knife reaches about the plane E—E of Figure 3, the constantly rotating chuck fingers 22 are caused to engage the work, by the cam 96, and as soon as the cocoanut is supported by the chuck 22, the fingers 23 release so that the knife may continue on the left hand end of the cocoanut without obstruction until it reaches the point S on the axis thereof, at which time the cocoanut has been completely pared. Thus, because of the timing of the machine, there is no pause in the paring of the cocoanut.

When the knife reaches the point S, the cam 132 has reached that point at which it causes the upward movement of the arm 128, thereby rocking bell crank 124, 125 in a counter-clockwise direction to advance the plunger 114 and rock the knife carrier 104 about its pivot 106 against the action of the spring 116 to move the knife along the path Z to a point, say, W, (Figure 3) well away from the end of the cocoanut. The knife is then returned along the path V by the rotation of the hollow shaft 120 in a counter-clockwise direction, as viewed in Figure 1, through the action of the cam 144, permitting the spring 137 to retract the rack 138. At this time, a lug 72 on the cam 96 is brought into engagement with the bearing surface 71 on the bell crank 68, 69, rocking the bell crank in a clockwise direction, as viewed in Figure 2, to retract the connecting rod 66, thereby rocking the bell crank 61, 62 in a clockwise direction to release the latch member 58 and permit the counterweight 64 to swing the cocoanut supporting structure outwardly so that the pared cocoanut can be removed and a new cocoanut inserted therein. At this time, the knife 98 lies approximately in the plane E—E. This movement of the latch member 58 away from the latch 60 releases the clutch arm 37 and permits the spring 38 to draw the clutch actuating rod 32 upwardly to declutch the worm shaft 24 and permit the rotation of the cycle shaft 21 to cease until a new cocoanut is in position for paring. To eject the work, the handle 51 is pulled forwardly, thus drawing the arm 46 outwardly and causing the arm 45 to depress the spring 41, allowing the arm 48 to fall away from the work C and the work to drop out. A new cocoanut is then held in position, the handle 51 is released permitting spring 41 to bring the arms 46 and 48 together to grip the work, the work being centralized, as hereinbefore described. The carrier is then normally returned to operating position, which causes a resumption of the operations described.

It will thus be seen that a machine has been provided which is simple and composed of relatively few parts. A cocoanut may be readily inserted and removed and the various steps of paring and ejecting are all controlled by simple mechanism from a cycle shaft. While the machine has been described as intended primarily for the paring of a cocoanut, it will be obvious that it is equally applicable to operate on other objects as well, all such objects being referred to herein as work.

Various modifications will occur to those skilled in the art, in the configuration and disposition of the component elements going to make up the invention as a whole, as well as the use to which the paring machine is put, and no limitation is intended by the phraseology of the foregoing specification or illustrations in the accompanying drawings, except as indicated in the appended claims.

What is claimed is:—

1. In a machine of the character described, in combination, a knife, a knife carrier, a rotatable knife support on which the carrier is pivoted, a spring to urge the carrier to bring the knife into contact with the work, a plunger to move the carrier against the action of the spring, a cam, cam controlled means to push the plunger, a second cam, a reciprocating rack advanced thereby, operative connections between the rack and support to rotate the same, and a spring to return the rack and thereby return the support.

2. In a machine of the character described, in combination, rotatable means to alternately engage opposite ends of the work, a work positioning device therebetween comprising relatively movable arms, spaced rollers on each arm disposed one above the other to rotatably receive the work, and means normally urging the arms together.

3. In a machine of the character described, in combination, a work carrier comprising relatively movable arms, spaced rollers on each arm disposed one above the other to rotatably receive the work, means normally urging the arms together, a counterweight for the carrier, and a latch to oppose the counterweight.

4. In a machine of the character described, in combination, rotatable means to alternately engage opposite ends of the work, a work positioning device therebetween comprising pivoted relatively movable arms, spaced rollers on each arm disposed one above the other to rotatably receive the work, means normally urging the arms together, and means to separate the arms to release the work.

5. In a machine of the character described, in combination, a rocking frame, a work carrier comprising downwardly depending relatively movable arms pivoted thereon, a bracket carried with each arm, a pair of spaced rollers on each bracket disposed in a transverse plane one above the other to rotatably receive the work, one of said brackets being pivoted and the other relatively fixed, means normally urging the arms together, a counterweight for the carrier, a latch to oppose the counterweight, and means to separate the arms to release the work.

6. In a machine of the character described, in combination, a work carrier comprising relatively movable arms, a pair of spaced rollers on each arm disposed in a transverse plane one above the other to rotatably receive the work, means normally urging the arms together, a latch to retain the work carrier in operative position, a cycle shaft, means controlled by the cycle shaft to release the latch, and automatic means to swing the work carrier.

7. In a machine of the character described, in combination, a pivoted work carrier comprising a pivoted rocking member, a pair of bell cranks having downwardly depending arms pivoted thereon, a bracket carried by each arm, a pair of spaced rollers on the end of each depending arm disposed in a transverse plane one above the other to rotatably receive the work, a depending rod fixed on the rocking member, a sleeve movable thereon and engaging the other arm of each bell crank, a spring on the rod and engaging the sleeve to normally urge the depending arms together, a latch to retain the work carrier in operative position, a cycle shaft, a cam on said shaft, latch releasing means actuated by the cam, and a counterweight carried with the rocking member to swing the work carrier from operative position.

8. In a machine of the character described, in combination, a constantly rotating power shaft, constantly rotating chucks rotated thereby, a cycle shaft, means controlled by the cycle shaft to cause the chucks to alternately engage the work, a knife, a knife carrier, a rotatable knife support on which the carrier is pivoted, a spring to urge the carrier to bring the knife into contact with the work, a plunger to move the carrier against the action of the spring, a cam, cam controlled means to push the plunger, a second cam, a reciprocating rack advanced thereby, operative connections between the rack and support to rotate the latter in one direction and a spring to return the rack and thereby move the support in the opposite direction.

9. In a machine of the character described, in combination, a constantly rotating power shaft, chucks constantly rotated thereby, a cycle shaft, means controlled by the cycle shaft to periodically drive the cycle shaft from the power shaft, means controlled by the cycle shaft to cause the chucks to alternately engage the work whereby one chuck releases after the other chuck has engaged the work, a cutting member, means controlled by the cycle shaft to move the cutting member into contact with the work, and a work carrier comprising relatively movable arms, spaced rollers on each of said arms, one above the other, to rotatably receive the work, means normally urging the arms together, a latch to retain the work carrier in operative position, means controlled by the cycle shaft to release the latch, and automatic means to move the work carrier to work ejecting position.

10. In a device of the character described, in combination, a constantly rotating power shaft, chucks constantly rotated thereby, a cycle shaft, means controlled by the cycle shaft to cause said chucks to alternately engage the work, a knife, a knife carrier, a rotatable knife support on which the carrier is pivoted, a spring to urge the carrier to bring the knife into contact with the work, a plunger, means controlled by the cycle shaft to cause the plunger to move the carrier against the action of the spring, a reciprocating rack, means controlled by the cycle shaft to advance the rack, operative connections between the rack and the support to rotate the latter in one direction, a spring to move the rack and thereby return the support in the opposite direction, a work carrier comprising a pivoted rocking member, a pair of bell cranks having downwardly depending arms pivoted thereon, a bracket carried by each arm, a pair of spaced rollers on the end of each depending arm disposed in a transverse plane, one above the other, to rotatably receive the work, a depending rod fixed on the rocking member, a sleeve movable thereon and engaging the other arm of each bell crank, a spring on the rod and engaging the sleeve to normally urge the depending arms together, a latch to retain the work carrier in operative position, latch releasing means controlled by the cycle shaft, and a counterweight carried with the rocking member to swing the carrier to work ejecting position.

11. In a machine of the character described, in combination, a work carrier comprising relatively movable arms, a plurality of horizontally disposed spaced rollers on each arm disposed one above the other, said rollers being provided at the ends, respectively, with flanges to rotatably receive the work therebetween, means normally urging the arms together, to cause the flanges to contact with the work and support the same.

12. In a device of the character described, in combination, spaced positioning means rotatably supporting the work intermediate its ends, a rotatable work gripping device disposed upon each side of said positioning means to grip an end of said work and rotate it when supported in the positioning means, and means to cause said work gripping devices to alternately grip the work.

13. In a machine of the character described, a constantly rotating power shaft, a pair of opposed chucks constantly rotated thereby, a cycle shaft driven from the power shaft, means controlled by the cycle shaft to cause said chucks to alternately engage respective ends of the work, a cutting member, yielding means normally moving the cutting member toward and into contact with the work, means controlled by the cycle shaft to move the cutting member out of contact with the work against the action of the yielding means, and means controlled by the cycle shaft to move the cutting member over the surface of the work from end to end while in contact therewith while said work is engaged by a chuck.

14. In a device of the character described, in combination, positioning means rotatably supporting the work intermediate its ends, a rotatable work gripping device disposed upon each side of said positioning means to grip an end of said work and rotate it when supported in the positioning means, means to cause said work gripping devices to alternately grip the work, a paring knife, and means to yieldingly hold the knife in paring contact with the work and move it from end to end of the work.

15. A paring machine comprising in combination means for supporting an object to be pared in a fixed paring position, said means being adapted to engage and rotatably support said object intermediate its ends with its surface unobstructed along a meridian line, means for imparting rotation to said object while the latter is supported by said first named means, and means movable from end to end of said object for paring the same during rotation thereof.

16. A paring machine comprising in combination means for supporting an object to be pared in a fixed paring position comprising mechanism adapted to engage and rotatably support said object intermediate its ends with its surface unobstructed along a meridian line, means for imparting rotation to said object while the latter is supported by said mechanism, and paring means movable in relation to said supporting means and object for paring the latter along said meridian line during rotation thereof.

17. A paring machine comprising in combination rotatable means for supporting an object to be pared in a paring position, said means engaging said object adjacent its equator without obstructing its end portions, a paring device and means for causing said device to travel from end to end of said object while supported in said paring position, and means whereby said object is rotated while held by said rotatable means.

18. A paring machine comprising in combination rotatable means for supporting an object to be pared in a paring position, said means engaging said object adjacent its equator without obstructing its end portions, a paring device and means for moving said device from end to end of said object along a meridian thereof, and means for rotating said object on its own axis within said rotatable supporting means during the paring operation.

19. A paring machine comprising in combination a support for an object to be pared, said support being stationary during the paring operation and carrying rotatable means engaging said object adjacent its equator and without obstructing its ends and supporting the same for rotation on its own axis, means for rotating said object, a paring device, and means for moving said paring device along a meridian of said object from end to end thereof while so supported and rotated.

20. A paring machine comprising in combination a support for an object to be pared, said support being stationary during the paring operation and carrying a plurality of elements rotatable on said support about their own axes, said elements engaging and rotatably supporting said object at a plurality of peripherally spaced points adjacent the equator thereof and leaving a meridian thereof unobstructed, means for rotating said object while supported by said elements, a paring device, and means for moving said device along said meridian from end to end of said object.

21. A paring machine comprising in combination means for supporting and rotating an object to be pared, said means including a plurality of elements rotatable on their own axes, said elements engaging and rotatably supporting said object at a plurality of peripherally spaced points adjacent the equator thereof and leaving a meridian thereof unobstructed, a paring device, and means for moving said paring device along said meridian from end to end of said object.

22. A paring machine comprising in combination means for supporting and rotating an object to be pared on its own axis in a paring position, said means including a plurality of elements rotatable on axes substantially parallel to the axis of rotation of said object and engaging and supporting said object at a plurality of peripherally spaced points adjacent its equator, and paring means movable from end to end of said object along a meridian passing between two of said elements.

23. A paring machine comprising in combination means for supporting and rotating an object to be pared on its own axis in a paring position, said means including a plurality of elements rotatable on axes substantially parallel to the axis of rotation of said object and engaging and supporting said object at a plurality of peripherally spaced points adjacent its equator, means resiliently urging said elements into engagement with said object and paring means movable from end to end of said object along a meridian passing between two of said elements.

24. A paring machine comprising in combination means for supporting and rotating an object to be pared, said means including a supporting device stationary during the paring operation and carrying a plurality of spaced elements rotatable on their own axes for supporting said object, said elements lying substantially in the equatorial plane of said object, and paring means movable between said elements along the surface of said object.

25. A paring machine comprising in combination means for supporting and rotating an object to be pared, said means including a supporting device stationary during the paring operation and carrying a plurality of spaced elements rotatable on their own axes for supporting said object, means resiliently urging said elements into engagement with the surface of said object, said elements lying substantially in the equatorial plane of said object, and paring means movable between said elements along the surface of said object.

26. In a device of the character described, in combination, a work supporting mechanism engaging the work at points intermediate its ends leaving the end portions and a meridianal line on the surface thereof unobstructed, means for rotating the work while supported by said mechanism, a cutting element, a support on which said cutting element is pivotally mounted, means for yieldingly urging said cutting element about its pivot into contact with the work, means for so moving said support as to cause said cutting element to travel in an arcuate path along said unobstructed meridianal line from end to end of the work, and means actuated when said cutting element reaches the end of its path for moving said element away from the work against the action of said yielding means.

27. In a device of the character described, in combination, a work supporting mechanism engaging the work at points intermediate its ends leaving the end portions and a meridianal line on the surface thereof unobstructed, means for rotating the work while supported by said mechanism, a cutting element, a rotatable support on which said cutting element is pivotally mounted, means for yieldingly urging said cutting element about its pivot into contact with the work, means for rotating said support in opposite directions to cause said cutting element to travel in an arcuate path along said unobstructed meridianal line from end to end of the work, and means actuated when said cutting element reaches the end of its path during rotation of said support in one direction for moving said element away from the work against the action of said yielding means.

28. A paring machine comprising in combination means for supporting an object to be pared, said means engaging said object on both sides of its equator leaving the end portions and a meridianal line on the surface thereof unobstructed and being automatically adjustable to support objects of irregular size and shape, means for rotating said object while so supported, and paring means movable with respect to said supporting means and object for paring the latter along said meridianal line during rotation thereof.

SECONDO L. CASELLA.